(12) United States Patent
Hetler

(10) Patent No.: US 6,206,130 B1
(45) Date of Patent: Mar. 27, 2001

(54) VEHICLE ANTI-THEFT DEVICE

(76) Inventor: Leslie L. Hetler, 6925 Lakecrest Ct., Fort Wayne, IN (US) 46815

( * ) Notice: Subject to any disclaimer, the term of this patent is extended or adjusted under 35 U.S.C. 154(b) by 0 days.

(21) Appl. No.: 09/100,341

(22) Filed: Jun. 8, 1998

(51) Int. Cl.[7] ............................................. B60R 25/00
(52) U.S. Cl. ...................... 180/287; 180/279; 123/333; 307/10.2
(58) Field of Search ................... 180/287, 279, 180/283; 123/333, 179.2, 179.4; 307/10.2, 10.3, 10.5

(56) References Cited

U.S. PATENT DOCUMENTS

| | | | |
|---|---|---|---|
| 4,682,062 | * 7/1987 | Weinberger | 180/287 |
| 4,690,240 | * 9/1987 | Russo | 180/287 |
| 4,805,722 | * 2/1989 | Keating et al. | 180/287 |
| 4,910,493 | * 3/1990 | Chambers et al. | 180/287 |
| 5,045,837 | * 9/1991 | Gosker | 180/287 |
| 5,370,201 | * 12/1994 | Inubushi | 180/287 |
| 5,535,844 | * 7/1996 | Samford | 180/287 |

* cited by examiner

*Primary Examiner*—Lanna Mai
*Assistant Examiner*—Toan C To
(74) *Attorney, Agent, or Firm*—Baker & Daniels

(57) ABSTRACT

A vehicle anti-theft device for controlling the operation of an electric fuel pump in the fuel tank of motor vehicles which includes a relay that is located in the fuel pump assembly and controlled by a radio-frequency receiver. The radio frequency-receiver is controlled by an input signal transmitted from a hand-held remote transmitter. As a safety precaution, an under-dash relay is provided so that system switching can only occur when the ignition switch is off. The relay in the fuel pump assembly also controls the illumination of an indicator light in the dashboard of the vehicle which indicates fuel pump status to the vehicle operator. Also mounted in the dashboard of the vehicle is an emergency plug into which the hand-held remote control transmitter can be inserted if the battery therein runs down.

15 Claims, 5 Drawing Sheets

VEHICLE ANTI-THEFT DEVICE

BACKGROUND OF THE INVENTION

The present invention relates to vehicle anti-theft devices and more particularly to a device which selectively disables the fuel pump of a motor vehicle.

Anti-theft devices for motor vehicles that include dash-mounted remote keypads with associated harness and fuel cut-off valves are known in the art. Such anti-theft devices require an operator of a motor vehicle to memorize a numeric code that has to be punched into the keypad. Moreover, such devices can include functional components such as cut-off valves that may be accessible to thieves who would have the opportunity to circumvent or disable the anti-theft devices.

The present invention provides an motor vehicle anti-theft device that includes a transmitter operated relay unit that is installed in the fuel pump housing of a vehicle and is therefore in the fuel tank and inaccessible to thieves.

SUMMARY OF THE INVENTION

An object of the invention is to provide a simple and cost-effective method of effecting complete immobilization of a vehicle so as to prevent theft of the vehicle. The invention involves the use of electronic circuitry similar to that utilized in present-day vehicles. The unit would be installed in the fuel pump assembly housing of a vehicle having the fuel pump in the fuel tank. The invention provides a simple means of shutting down the fuel supply to the engine of a vehicle without requiring a dash-mounted remote keypad (with associated harness) or a fuel cut-off valve, as required in previous anti-theft devices.

The supply voltage used to turn the fuel pump on or off would be controlled by electronic circuitry all contained within the fuel tank. Therefore, the anti-theft device would be essentially tamper-proof. The only recourse for a vehicle thief would be to connect a separate fuel tank and fuel pump to the engine fuel supply line, which would be prohibitive, messy, dangerous and time consuming.

DESCRIPTION OF THE DRAWINGS

The operation of the anti-theft device can be understood with reference to the following drawings.

DETAILED DESCRIPTION OF THE INVENTION

In general, the anti-theft device of the present invention includes:

A hand-held remote control transmitter of the type presently used to lock/unlock automobile doors and trunk lids;

An integrated fuel-pump relay and receiver module that are located within the fuel tank;

An antenna that is connected to the signal input of the receiver module in the fuel tank and located in an external location from the fuel tank;

Electrical leads connected to the components located within the fuel tank (four additional electrical leads than typically used for vehicles that do not include the anti-theft device of the present invention);

An indicator light that is mounted on the dashboard of the vehicle; and

A dashboard plug for receiving the hand-held remote control transmitter and supplying emergency power thereto if the batteries of the hand-held remote control transmitter should fail and/or need to be recharged.

In use, when the anti-theft device of the present invention is activated, power supply to the fuel pump in the fuel tank is turned off so that the fuel pump is rendered inoperative from within the fuel tank. Accordingly, the present invention does not require or effect any alterations to any of the external fuel lines (vapor, return and fuel-feed) of a vehicle.

Switching the fuel pump between an operative and inoperative mode is controlled using the hand-held remote control transmitter which can be conveniently carried in a handbag or pocket of the vehicle operator. According to one embodiment of the present invention, the hand-held remote control transmitter can be of a conventional design that includes buttons to lock and unlock the doors and/or trunk of a vehicle. In this embodiment, such a hand-held unit would merely include an extra button for activating/deactivating the anti-theft device of the present invention. According to another embodiment, the hand-held remote control transmitter can be a separate remote hand-held unit with a single button for activating/deactivating the anti-theft device of the present invention.

In the event of battery failure in the hand-held remote control transmitter when the antitheft device is activated, the operator would insert the hand-held unit onto an auxiliary plug provided on the dashboard of the vehicle. The auxiliary plug would provide the proper voltage (derived from the vehicle battery) to the hand-held unit for emergency use when the ignition is off.

The following explanation of the anti-theft device and its operation can be understood by referring to FIGS. 1 through 5.

Figure 1:
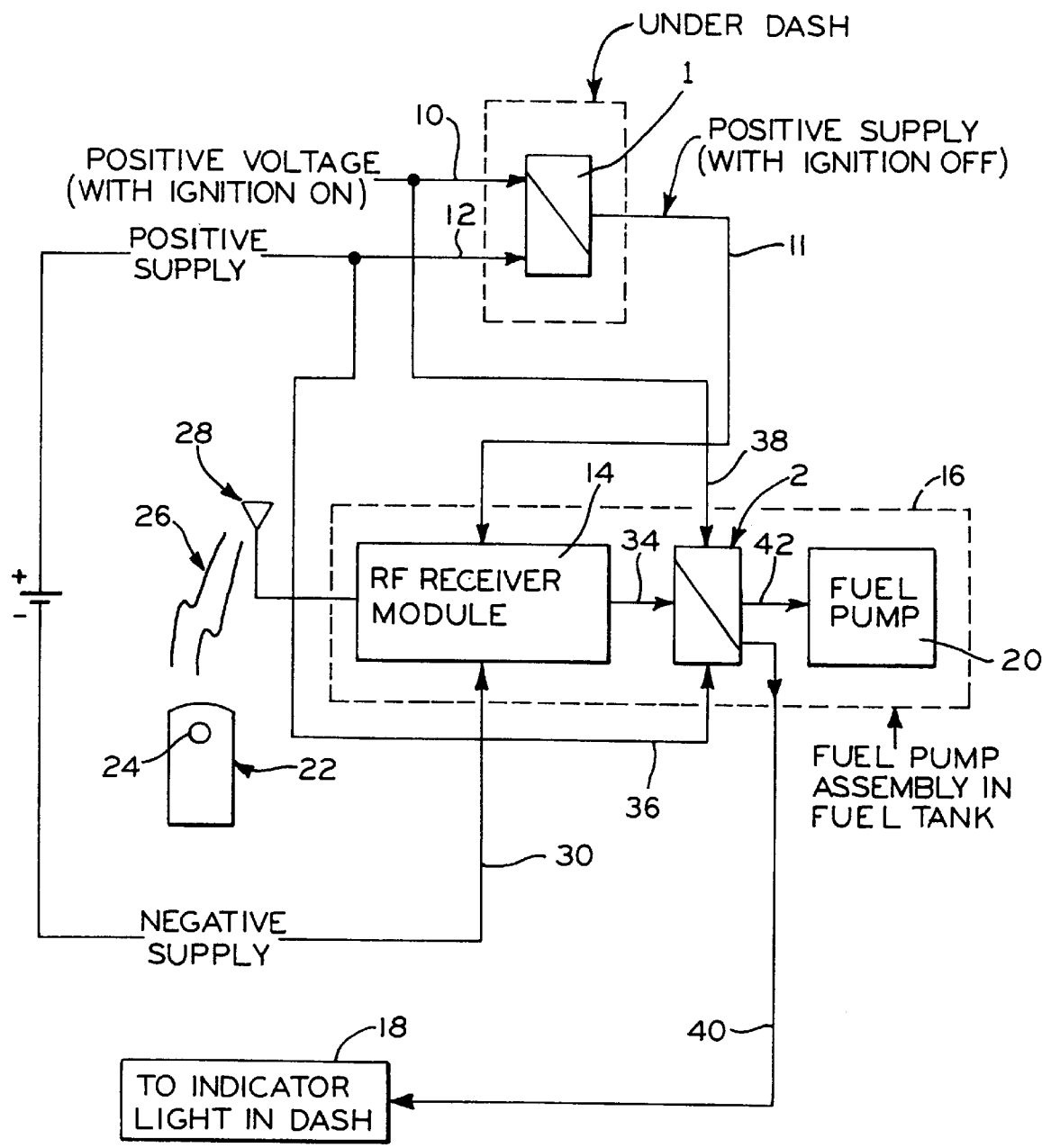
FIG. 1 is an overall block diagram of the anti-theft device according to the present invention.

FIG. 1 is an overall block diagram showing the anti-theft device according to the present invention. As depicted in FIG. 1, a second relay 1 is provided with input feeds 10 and 12. As discussed in more detail below, input feed 10 is coupled to the vehicle's ignition system so that, a positive voltage is fed therethrough to second relay 1 when the vehicle's ignition system is on. When the vehicle's ignition system is off, no voltage is fed through input feed 10. Input feed 12 is coupled to the vehicle's battery and is used to supply positive voltage to both receiver module 14 in fuel tank 16 and an indicator light 18 that is provided in the dash of the vehicle as discussed below. Second relay 1 includes an output feed 11 that is used to power receiver module 14 as discussed below. A positive voltage to indicator light 18 can be used to provide a visual signal that the anti-theft device is activated and that the fuel pump 20 is turned off. The hand-held remote control transmitter 22 depicted in FIG. 1 is used to cycle the state of first relay 2 with each successive push of button 24. In this regard, when hand-held remote control transmitter 22 is activated, it transmits a coded signal 26 that is received by antenna 28 of receiver module 14, as discussed below. Signal 26 is received by the receiver module 14, via antenna 28 as indicated in FIG. 1.

Receiver module 14 receives output feed 11 from second relay 1 as a positive input feed and a negative input feed 30.

The use of both positive and negative feeds to receiver module 14 allows the output feed 34 therefrom to be cycled between a positive and a negative output. The output feed 34 from receiver module 14 serves as an input feed to first relay 2.

As discussed below, relay 2 includes an input feed 36 that is coupled to the vehicle's battery and is used to supply positive voltage to indicator light 18 depending on the state of first relay 2. First relay 2 includes another input feed 38 that is coupled to the vehicle's ignition system so that, a positive voltage is fed therethrough to first relay 2. First relay 2 also includes an output feed 40 that is connected to indicator light 18 and another output feed 42 that supplies power to fuel pump 20, depending on the state of first relay 2.

Figure 2:
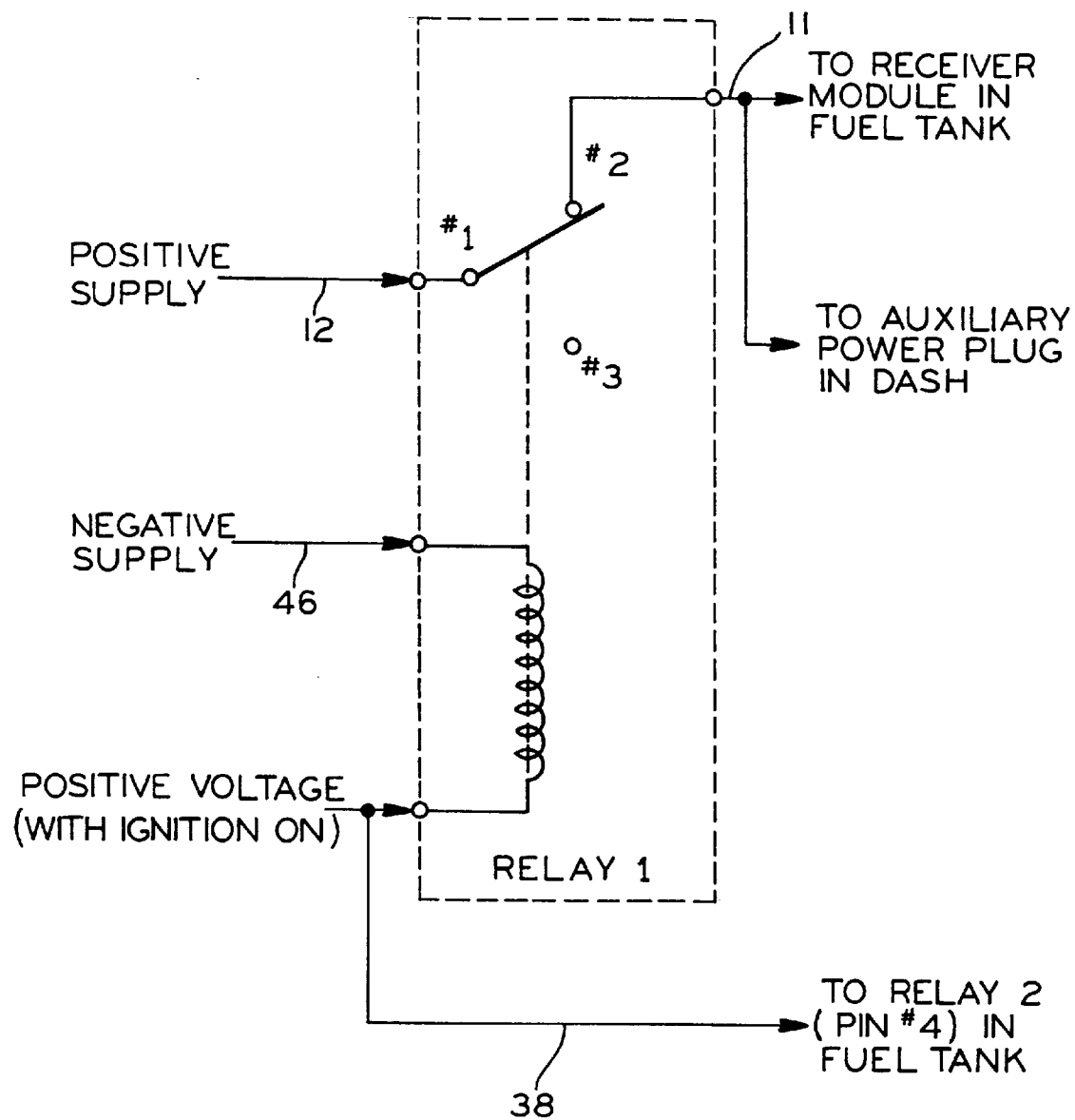
FIG. 2 is the schematic diagram of the under-dash relay circuit.

FIG. 2 is a schematic diagram of the under-dash relay circuit used according to the present invention. It is noted that first relay 1 would be the same as relays that are conventionally used in present-day vehicles. As indicated above, a positive voltage supply input feed 12 is continuously supplied from the vehicle battery to second relay 1 and a second input feed 10 is coupled to the vehicle's ignition system so that, a positive voltage fed therethrough to first relay 2 would only be present when the vehicle is in operation (when the ignition is on). A negative input feed 46 is supplied from the negative return vehicle battery voltage which is typically the chassis ground of the vehicle. The vehicle battery voltage would be within the operating voltage range of the relay coil of second relay 1. When the vehicle's ignition is off, second relay 1 is not energized through input feed 10. However, a positive voltage is supplied through input feed 12 to second relay 1 and across pins #1 and #2 and to receiver module 14 via output feed 11. Receiver module is located in the fuel tank 16 as indicated. When the vehicle's ignition system is on, second relay 1 breaks the connection between pins #1 and #2 and connects pins #1 and #3. In this switched configuration, voltage is disconnected from the receiver module 14 in the fuel tank 16. Therefore, the state of first relay 2 (energized or de-energized) in the fuel tank cannot be changed when the ignition is on. If the vehicle engine is operating normally, the fuel to the engine could not be interrupted by accidently pushing the button of the hand held remote control transmitter 22. When the ignition is off, a positive voltage supply from the vehicle's battery could be connected to an auxiliary power plug (see FIG. 4) provided in the dash for emergency use in the case of a run-down battery in the handheld remote control transmitter 22. It could also be used to charge the battery in the hand-held remote control transmitter 22 if equipped with a rechargeable battery.

Figure 3:
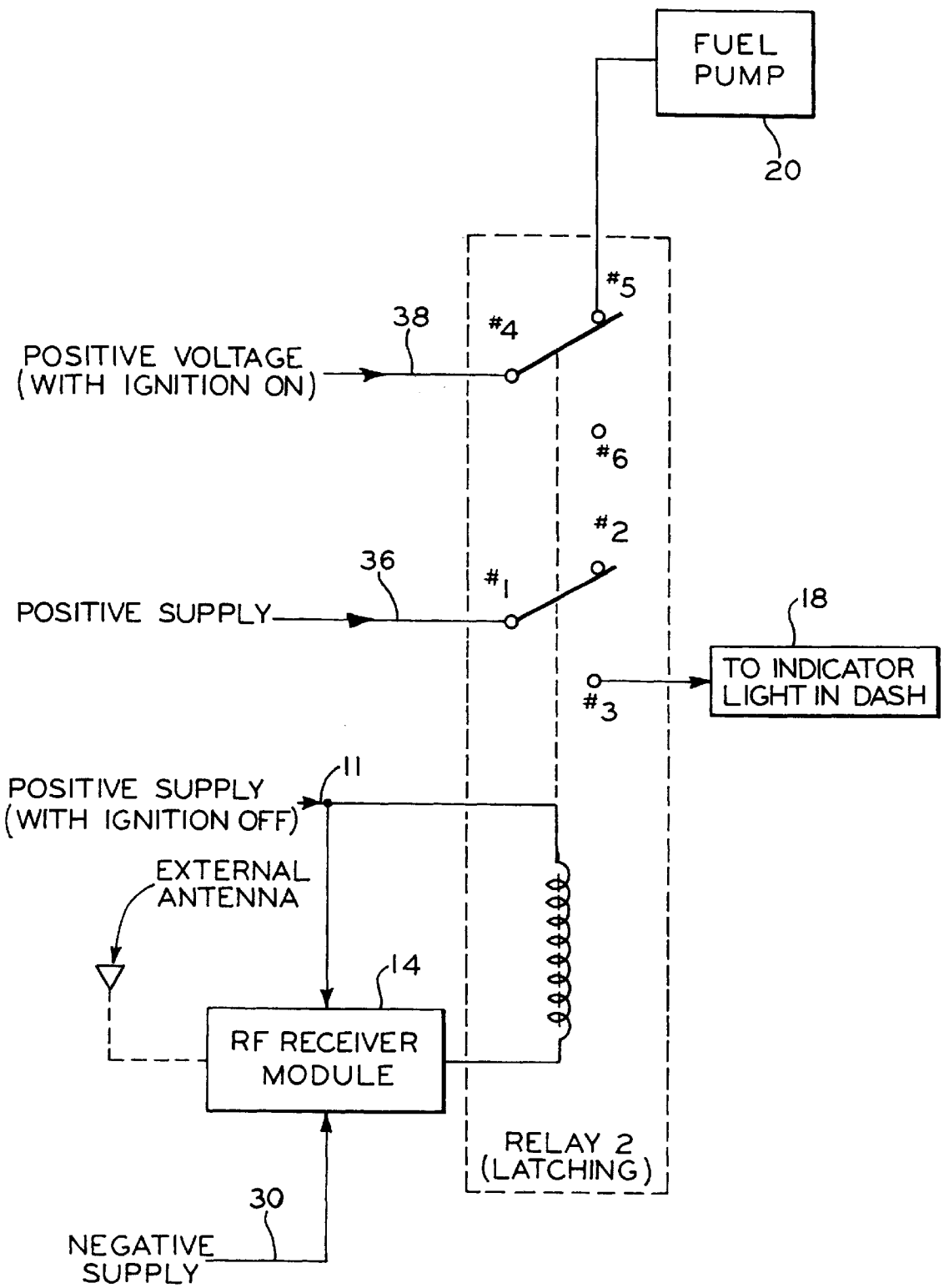
FIG. 3 is a schematic diagram of the circuitry enclosed within the fuel pump assembly housing in the fuel tank.

FIG. 3 is an electrical schematic diagram of the switching and components located in the fuel pump assembly housing in the fuel tank 16 (except for the external antenna connected to the signal input of receiver module 14). First relay 2 is a latching relay which would hold its lastordered state (preventing first relay 2 from de-energizing when the power supply from the receiver module 14 is removed, as when the vehicle's ignition is turned on).

As discussed above, the receiver module 14 receives output feed 11 from second relay 1 as a positive input feed and a negative input feed 30. The use of both positive and negative feeds to receiver module 14 allows the output feed 34 therefrom to be cycled between a positive and a negative output. The coil of relay 2 is shown as being energized by receipt of a momentary ground from the receive module 14. If the receiver module 14 were to be provided with a positive momentary signal, the other side of the coil would simply be connected to ground or negative voltage supply. The vehicle battery voltage should be within the operating voltage range of the relay coil of first relay 2.

When first relay 2 is energized from its state depicted in FIG. 3, positive voltage supplied though input feed 36 becomes an output from first relay 2 from pin #3 and is supplied to indicator light 18 to provide visual indication of the system state whether the ignition is on or off. Preferably the indicator light 18 would be a large flashing red display with an imprinted message, such as "DO NOT START" or "FUEL TANK LOCKED." Here it is noted that attempting to start the vehicle engine while the fuel pump is inoperative would cause no damage—the engine would start momentarily and then quit, and it would be impossible to restart the engine.

When first relay 2 is de-energized, the positive voltage from input feed 38 (with ignition on) is connected to the fuel pump 20 through pins #4 and #5 of first relay 2, and the vehicle engine operates in the normal manner.

The receiver module 14 accepts a radio frequency (RF) coded transmission from the hand-held remote control transmitter 22 and provides a single positive or negative trigger output to the coil of first relay 2. The receiver module 14 and first relay 2 would be miniaturized and installed in the fuel pump assembly housing, which is installed inside the fuel tank 16.

Figure 4:
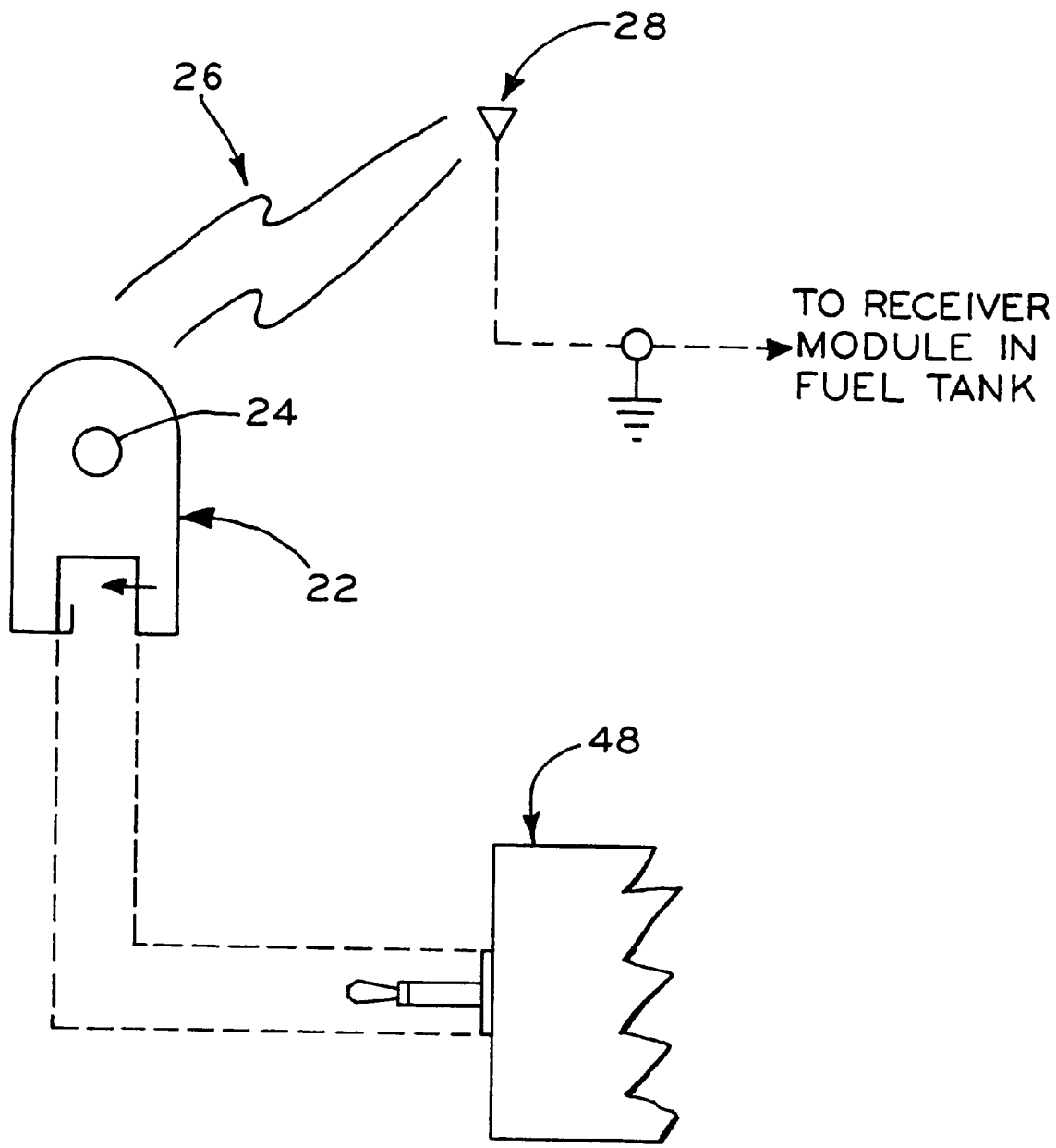
FIG. 4 is a diagram of the hand-held remote transmitting unit showing the emergency auxiliary power plug provided in the dash of a vehicle.

FIG. 4 illustrates a hand-held remote control transmitter 22 with a connecting port 48 for connecting to the auxiliary power plug in an emergency. The auxiliary power plug would provide power for the hand-held remote control transmitter 22 only when the ignition is off, as shown in FIG. 2.

Figure 5:
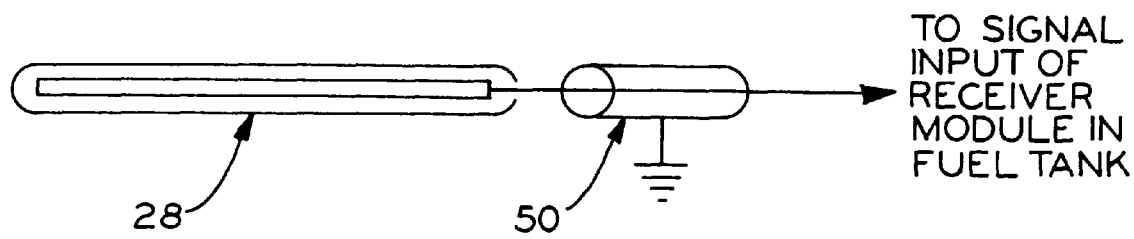
FIG. 5 is a diagram of the external antenna connected to the signal input of the receiver module in the fuel tank.

FIG. 5 is a diagram of the external antenna connected to the signal input of the receiver module in the fuel tank. The antenna 28 would be a stub antenna approximately six inches long and insulated outside the fuel tank 16. It would be mounted in the trunk above the fuel tank in a concealed position. Alternatively, the antenna 28 could be mounted near the fuel tank 16 but not in the vehicle's trunk, if the trunk provided excessive RF shielding. The coaxial cable 50 connecting the antenna 28 to the receiver module 14 in the fuel tank 16 would have its outer conductor grounded to the vehicle's chassis at any point along its length.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed is:

1. A vehicle anti-theft system for a vehicle which includes an ignition system, a battery, a fuel tank, and an electric fuel pump located in the fuel tank, said system comprising:

a first relay located in the fuel tank;

a receiver module located in the fuel tank; and a remote transmitter that can be activated to transmit an activation signal to the receiver module, the first relay including a first input that receives power when the ignition system is on, a second input that receives power from the battery, a third input that is coupled to the receiver module, and a first output that is coupled to the electric fuel pump, the receiver module including a first input for receiving a voltage, a second input for receiving a voltage, and an output that is coupled to the third input of the first relay, the receiver module being configured so that when receiver module receives an activation signal from the remote transmitter it alternatively connects one of the first input and second input to the output thereof, the first relay being configured so that upon receipt of a voltage from one of the first input and second input of the receiver module, the first relay supplies power to the fuel pump, and upon receipt of a voltage from another one of the first input and second input of the receiver module, the first relay prevents the supply of power to the fuel pump.

2. Vehicle anti-theft system or a vehicle according to claim 1, further comprising a second relay that is coupled between the first input of the receiver module and the ignition system and supplies power directly to the fuel pump only when the ignition system is on.

3. A vehicle anti-theft system or a vehicle according to claim 1, further comprising an indicator light that is coupled to the first relay and which is activated when power to the fuel pump is interrupted.

4. Vehicle anti-theft system or a vehicle according to claim 1, wherein the remote transmitter comprises a hand-held transmitter.

5. A vehicle anti-theft system or a vehicle according to claim 4, wherein the vehicle anti-lock system further includes an electrical port to which the remote transmitter can be coupled to receive power from the vehicle's battery.

6. Vehicle anti-theft system or a vehicle according to claim 1, wherein the first relay comprises a latching relay.

7. A vehicle anti-theft system or a vehicle according to claim 1, wherein the receiver module includes an antenna which is located outside of the fuel tank.

8. A method of disabling a fuel pump of a motor vehicle which is located in a fuel tank of the motor vehicle, the method comprising:

providing a first relay located in the fuel tank which can be activated between a first state in which power is supplied therethrough to the fuel pump and a second state in which power is prevented from being supplied therethrough to the fuel pump;

providing a receiver module located in the fuel tank and coupled to the first relay for toggling the first relay between the first and second states;

providing a remote transmitter that can be activated to transmit an activation signal to the receiver module; and operating the remote transmitter to cause it to transmit an activation to the receiver module and thereby cause the receiver module to toggle the first relay between the first and second states.

9. A method of disabling a fuel pump of a motor vehicle according to claim 8, which further comprises:

providing a second relay remote from the fuel tank which is activated by an ignition system of the motor vehicle so that when the ignition system is on the second relay supplies power directly to the fuel pump.

10. A method of disabling a fuel pump of a motor vehicle according to claim 8, further comprising:

coupling an indicator light to the first relay so that the indicator light is activated when power to the fuel pump is interrupted.

11. A method of disabling a fuel pump of a motor vehicle according to claim 8 wherein the remote transmitter is a hand-held transmitter.

12. A method of disabling a fuel pump of a motor vehicle according to claim 11 further comprising:

providing an electrical port to which the remote transmitter can be coupled to receive power from a battery of the motor vehicle.

13. A method of disabling a fuel pump of a motor vehicle according to claim 8, wherein the first relay comprises a latching relay.

14. A method of disabling a fuel pump of a motor vehicle according to claim 8, wherein the receiver module includes an antenna and the antenna is located outside of the fuel tank.

15. A system for disabling a fuel pump of a motor vehicle which is located in a fuel tank of the motor vehicle, the system comprising:

a first relay located in the fuel tank which is configured to be activated between a first state in which power is supplied therethrough to the fuel pump and a second state in which power is prevented from being supplied therethrough to the fuel pump;

a receiver module located in the fuel tank and coupled to the first relay and configured to toggle the first relay between the first and second states; and a remote transmitter configured to transmit an activation signal to the receiver module and thereby cause the receiver module to toggle the first relay between the first and second states.

* * * * *

UNITED STATES PATENT AND TRADEMARK OFFICE
CERTIFICATE OF CORRECTION

PATENT NO.     : 6,206,130 B1
DATED          : March 27, 2001
INVENTOR(S)    : Leslie L. Hetler It is certified that error appears in the above-identified patent and that said Letters Patent is hereby corrected as shown below:

Claim 2, column 5,
Line 12, delete "Vehicle" first occurrence and substitute therefor -- a vehicle --

Claim 4, column 5,
Line 21, delete "Vehicle" first occurrence and substitute therefor -- a vehicle --

Claim 6, column 5,
Line 28, delete "Vehicle" first occurrence and substitute therefor -- a vehicle --

Signed and Sealed this

Twenty-third Day of October, 2001

Attest:

NICHOLAS P. GODICI
Attesting Officer    Acting Director of the United States Patent and Trademark Office